March 27, 1934.  F. C. THOMPSON  1,952,954
CLUTCH ARRANGEMENT FOR CHANGE SPEED DEVICES
Filed Dec. 6, 1926  2 Sheets—Sheet 2

Patented Mar. 27, 1934

1,952,954

UNITED STATES PATENT OFFICE 1,952,954

CLUTCH ARRANGEMENT FOR CHANGE SPEED DEVICES

Fred C. Thompson, Detroit, Mich., assignor, by mesne assignments, to Automotive Research Corporation, a corporation of Delaware Application December 6, 1926, Serial No. 152,733

5 Claims. (Cl. 74—57)

This invention relates to change speed devices, such, for instance, as is illustrated in my prior Patent No. 1,877,540 issued September 13, 1932, and particularly to an improved clutch arrangement for such devices.

It is the primary object of my invention to provide in a change speed device a simple, compact and effective clutching mechanism for accomplishing speed changes.

Figure 1:
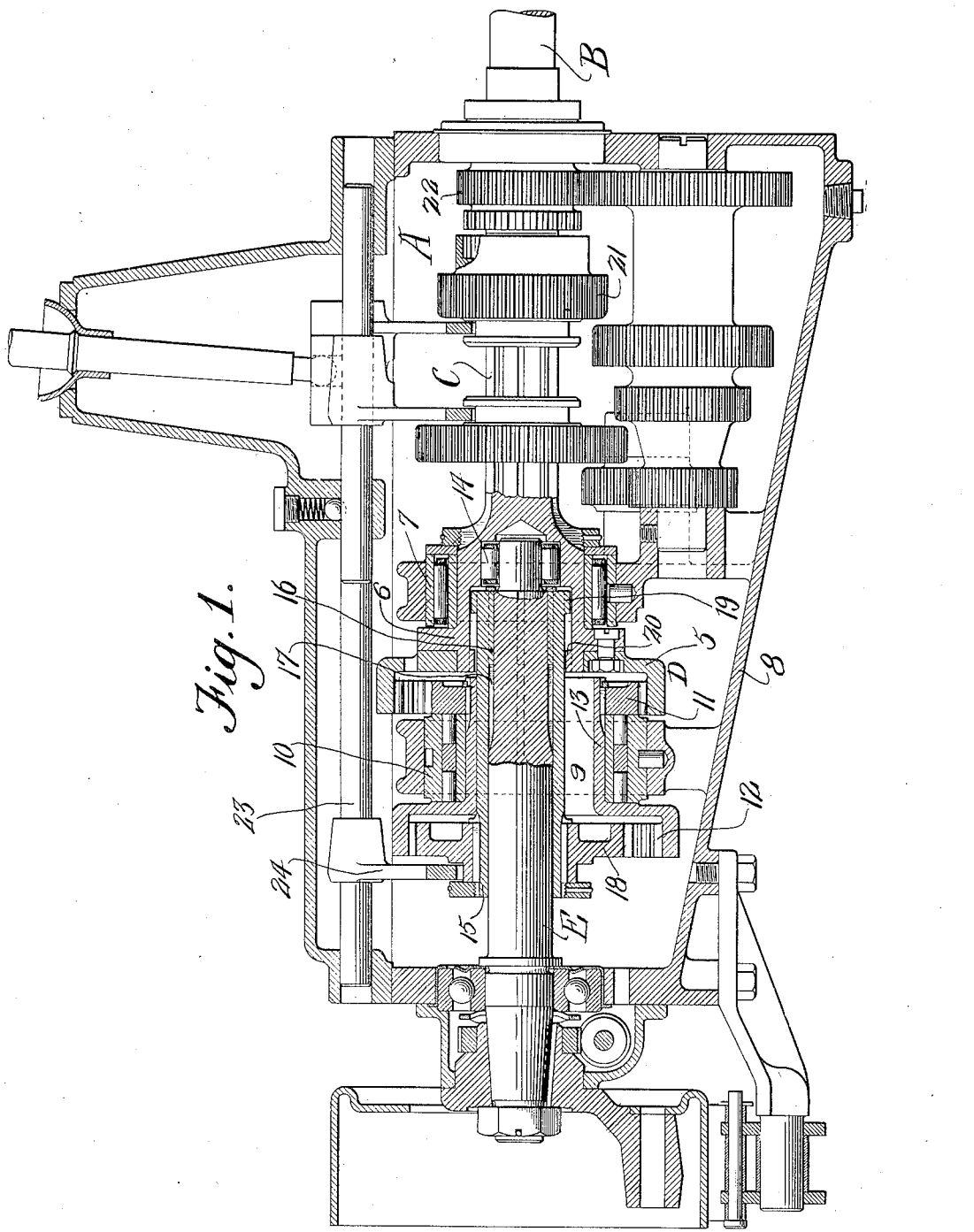
Figure 2:
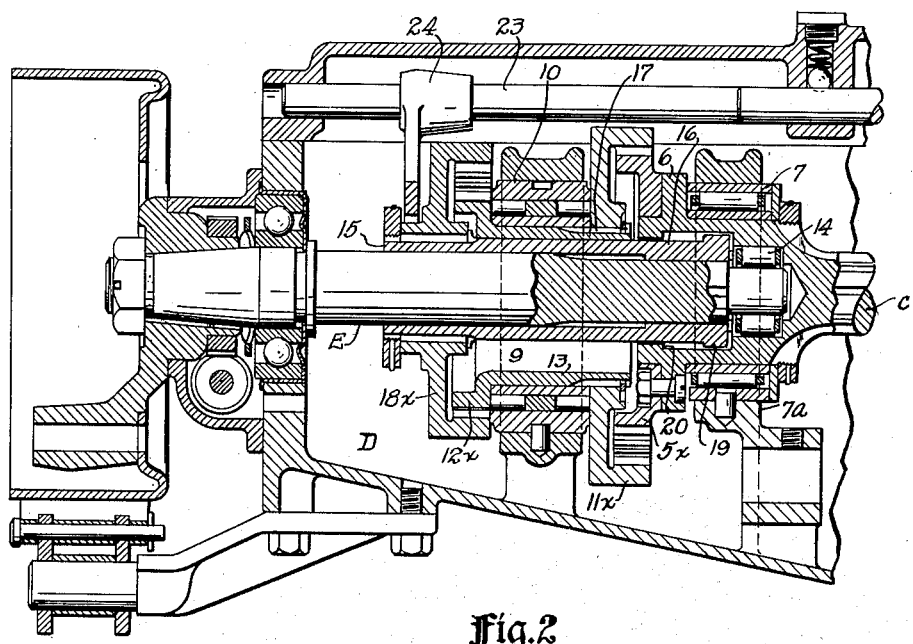
Figure 3:
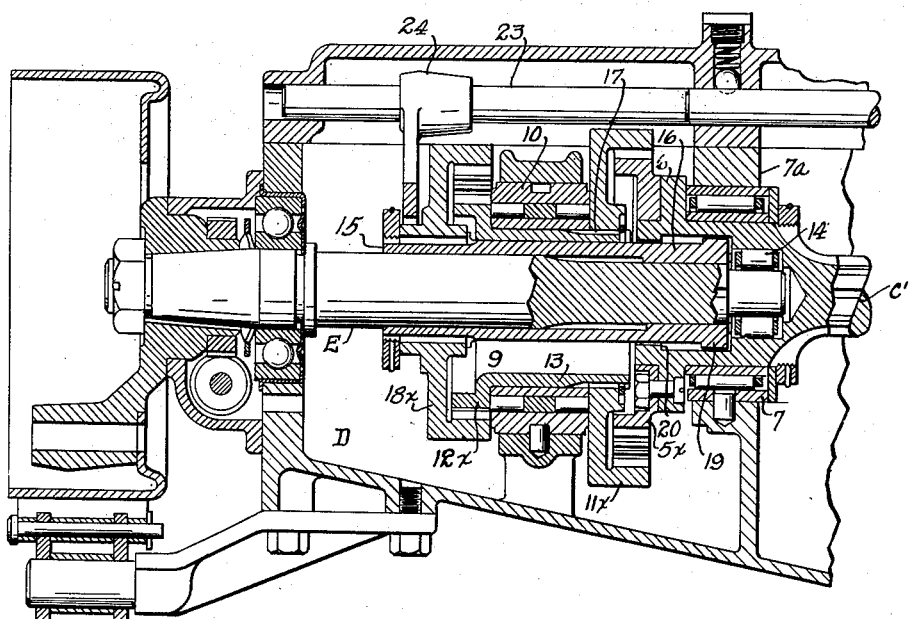

The foregoing, together with such other objects as may hereinafter appear, or are incident to my invention, I obtain by means of a construction which I have illustrated in preferred forms in the accompanying drawings, wherein Figure 1 is a sectional elevation through a standard gear transmission with my invention applied thereto, and Figs. 2 and 3 are similar sectional views of modifications of the invention.

Referring to the drawings Fig. 1, it will be seen that I have shown my improved device applied to a standard or usual form of automobile gear transmission A having three speeds forward and a reverse, as is well known in the art. The reference letter B denotes the driving shaft of the usual transmission A which is coupled to the engine, and the reference letter C denotes the driven shaft of the gear transmission A which may be connected to the driving shaft B for direct drive or change speed drive through the medium of the gearing.

My improved change speed device comprises, in general, a double train of gears D connected at one end to the driven shaft C, of the usual gear transmission, and at the other end through the medium of a compact and simple clutching device to the shaft E, which, in turn, may be connected by means of any suitable form of universal coupling device to the universal shaft of the vehicle. The shaft C is, of course, the drive shaft of the train D. By associating my improved change speed device with a usual form of transmission device, it will be seen that I am enabled to obtain change speeds in addition to those obtainable by the usual transmission device alone.

Referring now to the particular construction of the change speed device, this comprises as shown in Fig. 1, a pair of internal-external gear trains 5, 11 and 12, 18,—each including an internal and an external gear, the driving order of each train being the same (overdriving as shown).

It will be seen that the internal gear 5 is secured in any suitable manner to the enlarged portion 6 of the driven shaft C, which shaft, at such enlarged portion, is mounted in an anti-friction bearing 7, in turn mounted in the transmission housing 8. A sleeve forming a hollow compound gear 9 is mounted in a bearing 10 in the housing 8, the axis of which is fixed and offset from, that is, eccentric to the axis of the shafts C and E. The compound gear 9 comprises an external gear 11 adapted to mesh with the internal gear 5, an internal gear 12, and a hollow sleeve portion 13 connecting the gears 11 and 12. The gears 5 and 11 are in constant mesh.

The shaft E, above referred to, is aligned with the driven shaft C of the usual gear transmission, and extends through the bore of the compound gear into the hollow end of the driven shaft C, in which shaft it has a bearing at 14.

A clutch device is carried by the shaft E comprising a sleeve member 15 extending within and surrounded by the sleeve or compound gear 9, the sleeve 15 having internal keys 16 fitting the splines 17 in the shaft E. Thus, it will be seen that the sleeve 15 may be moved longitudinally of the shaft, but cannot rotate with respect to the shaft. At one end this sleeve 15 has rigidly secured thereto, as by means of keys, the external gear 18, which gear is adapted to mesh with the internal gear 12 of the compound gear 9. At the other end this sleeve 15 is provided with direct driving external clutch teeth 19. Internal direct driving clutch teeth 20 are provided in the hollow portion of the driven shaft C which are engaged by the sleeve clutch teeth 19 when the sleeve 15 is moved, as will hereinafter appear.

Assuming, now, that the usual gear transmission A is in high or direct speed position, in which position the gear 21 would be moved to the right to clutch said gear with the driven gear 22, and that it is desired to go into overspeed drive, the operating rod 23 with its fork 24 engaging the clutch sleeve 15 is moved to the right to the position shown in Fig. 1. In this position the external gear 18 carried by the clutch sleeve 15 meshes with the internal gear 12 of the compound gear 9, and a speed increase between the driven shaft C and the shaft E is obtained. It is pointed out that in this position, the clutch teeth 19 and 20 are disengaged.

On the other hand, if it should be desired to drive the universal shaft at engine speed, that is, at direct drive speed of the usual gear transmission, the clutch sleeve 15 is moved to the left, which causes the external gear 18 to unmesh from the train of overspeed gearing and causes the complementary clutch teeth 19 and 20 to come into engagement. Thus, the driven shaft C and the shaft E are connected for direct drive. In this position, the gears of the overspeed device run idle because, as above pointed out, the gear 18 is moved out of mesh with the balance of the train.

While I have described my device as an overspeed one, it will be seen from Fig. 2, showing the modified internal-external gearing, that by merely reversing the internal and external gears, a speed reduction may be obtained. The gears 5x and 12x as there illustrated are external gears and the gears 11x and 18x are internal gears. Otherwise the construction is the same.

It is also to be understood that in some instances it may be desirable to secure the driving gear of the first internal-external train directly to a driving shaft, in which case the usual transmission would be dispensed with, and the device D would then be the only change speed device employed. This is illustrated in Fig. 3 wherein the internal and external gears are arranged as in Fig. 2 and are similarly numbered and the web 7a is extended to form the forward wall of the gear case in which the driving shaft C' is journaled on a bearing 7 as previously described. The control for the two speed internal-external unit is substantially as shown in Fig. 1 but moved to a different portion of the gear case cover section.

I claim:—

1. A four speed transmission for vehicles, comprising a clutch drive shaft, an aligned transmission shaft telescopically positioned relatively thereto, means to directly clutch said shafts including a member slidable on the driven shaft, means to drive the driven shaft from the driving shaft through a pair of internal-external gear trains, the said sliding member constituting the driven gear of the second gear set of said pair, the driving and driven order of the external and internal gears of each gear train being the same.

2. In a transmission mechanism of the class described comprising, a casing, a driving shaft journalled in a wall of said casing, an external gear and a clutch member on said shaft within said casing, a driven shaft having one end journalled in the opposite wall of said casing and its opposite end journalled in said driving shaft, a sleeve surrounding said driven shaft journalled independently thereof in said casing, an internal gear at one end of said sleeve in constant mesh with the external gear of said driving shaft, an external gear at the opposite end of said sleeve, a slidable sleeve on said driven shaft and in driving engagement therewith, an internal gear on one end of said slidable sleeve adapted for driving engagement with said sleeve when moved in one direction, and an external clutch member at the opposite end of said slidable sleeve for driving engagement with said clutch member on the driving shaft when moved in the opposite direction.

3. A transmission comprising a driving shaft having direct driving teeth thereon, a co-axial driven shaft having one end journalled in said driving shaft, an axially movable sleeve splined on said driven shaft and having teeth engageable with said direct driving teeth, a second sleeve surrounding the first mentioned sleeve and journalled eccentrically thereof, said second sleeve having both internal and external gears, a pinion on said driving shaft continuously meshing with said internal gear, an internal gear on the first mentioned sleeve engageable with said external gear and means for axially moving the first mentioned sleeve to move the internal gear mounted thereon into engagement with said external gear.

4. A transmission comprising a driving shaft, a co-axial driven shaft, a hollow compound gear surrounding one of said shafts and eccentrically journalled to rotate about a fixed axis, a gear on said driving shaft constantly meshing with said compound gear, a sleeve slidable on said driven shaft carrying an internal gear engageable with said compound gear in one axial position of the latter and means for drivingly connecting said driving shaft to said sleeve when the latter is in another axial position of adjustment.

5. A transmission comprising a driving shaft having clutch teeth thereon, a coaxial driven shaft having one end journalled in said driving shaft, an axially movable sleeve splined on said driven shaft and having clutch teeth engageable with the aforesaid clutch teeth, a second sleeve surrounding the first mentioned sleeve and journaled eccentrically thereof, said second sleeve having both internal and external gears, gear teeth on said driving shaft continuously meshing with one of the gears of the eccentrically journaled sleeve, gear teeth on the first mentioned sleeve engageable with the other gear of the eccentrically journaled sleeve, and means for axially moving the first mentioned sleeve to move the gear teeth thereof into and out of engagement with said gear of the eccentrically journaled sleeve and to mesh and unmesh the said clutch teeth.

FRED C. THOMPSON.